United States Patent [19]

Parry

[11] 3,961,852

[45] June 8, 1976

[54] WRITING INSTRUMENT

[76] Inventor: David W. Parry, 2390 N. Forest Road, Getzville, N.Y. 14068

[22] Filed: June 3, 1974

[21] Appl. No.: 475,653

[52] U.S. Cl. .................. 401/195; 401/52; 401/213; 35/62

[51] Int. Cl.$^{2}$ .................. B43K 29/00

[58] Field of Search .................. 401/52, 213, 195, 98, 401/243.7, 202, 98; 40/334; 281/45; 35/61, 66

[56] References Cited

UNITED STATES PATENTS

| | | | |
|---|---|---|---|
| 418,217 | 12/1889 | Paige | 40/335 |
| 1,211,356 | 1/1917 | Roetker | 40/335 |
| 1,595,900 | 8/1926 | Maas | 401/52 X |
| 1,832,318 | 11/1931 | Myers | 40/334 |
| 3,846,927 | 11/1974 | Geffin | 401/195 X |
| D164,548 | 9/1951 | Bush | 40/334 |

FOREIGN PATENTS OR APPLICATIONS

| | | | |
|---|---|---|---|
| 510,262 | 4/1952 | Belgium | 40/334 |

*Primary Examiner*—Lawrence Charles
*Attorney, Agent, or Firm*—E. Herbert Liss

[57] ABSTRACT

A pen or pencil with a removable cap at either end may carry a pocket engaging clip; a smooth flat plate of light weight, relatively rigid sheet material is disposed tangentially to the cap circumferentially spaced from the clip. The plate may carry a pad of writing sheets or an erasable surface to provide a note taking memo pad; it may also include a straight edge with indicia therealong to provide a line ruling and measuring device and may include small apertures so as to serve as an eraser shield. In its various forms the memo pad may include a hinged cover, a roll of paper; it may be integral with the cap, permanently or removably secured thereto. The hinged cover may include a pocket for retaining sheets of paper with notations thereon.

6 Claims, 13 Drawing Figures

WRITING INSTRUMENT

BACKGROUND OF THE INVENTION

The present invention relates to a self-contained memorandum combination and, more particularly, to a self-contained memorandum combination which includes a writing instrument, a writing surface and additional note taking aids.

Pocket size notebooks with a holder for an undersized pencil or pen are presently available, as are clipboards with a pen or pencil attached. The clipboard type of arrangement would be either too bulky for pocket use or the writing instrument so small as to be awkward for normal use. Small writing instruments invite illegible writing.

U.S. Pat. Nos. 701,072, May 27, 1902, J. A. M. Morris and 1,212,020, Jan. 9, 1917, I. Contant, Jr., disclose writing instruments with note paper carried in the barrel or cap, respectively, of a writing instrument. Neither discloses, however, a self-contained rigid surface to serve as a backboard for writing. Another approach is illustrated in U.S. Pat. No. 2,171,188, Aug. 29, 1939, I. E. Morris, which again is primarily a notation pad with a pencil attached.

SUMMARY OF THE INVENTION

According to the present invention a writing instrument is provided which is a self-contained unit including a writing stylus having a tapered blunt, rounded or pointed tip such as a pen or a pencil, for forming an impression on a writing surface, as for example, a paper tablet or a readily erasable surface carried on a flat, smooth, light weight and relatively rigid thin plate or backboard. The backboard may be mounted either integrally or removably on a removable cap of a pen or pencil. To utilize the combination the cap may be removed and held in one hand with the writing surface and backboard positioned for writing upon while the remaining portion of the instrument is held in the other hand for writing upon the surface. The backboard obviates the need for a table or other rigid writing surface; it may be constructed to incorporate additional functions for enhancing the effectiveness of the combination for writing purposes. For example, it may include a straight edge for making lines or underlining, with or without indicia for linear or angular measurement. This instrument may be unobtrusively carried in a shirt or jacket breast pocket, accomodate additional writing instruments without obstruction immediately adjacent to the barrel of the pen or pencil and serve as a shield to prevent inadvertent marking of the clothes when additional instruments with exposed marking tips are inserted into the pocket.

The principal object of the present invention is to provide an improved writing instrument which is a self-contained, multi-purpose unit effective for making notations.

Another object of the invention is to provide an improved multi-function self-contained normal sized writing instrument with a readily reusable writing surface.

A further and more specific object of the invention is to provide an improved writing instrument which is a self-contained, multi-purpose unit effective for making notations in the absence of auxiliary writing equipment and is of the usual size readily accomodated by the hand for writing and which can be carried unobtrusively in an exposed pocket, can accomodate additional writing instruments in the pocket and can serve as a pocket shield, straight edge or eraser shield.

Other objects and advantages of the invention will be apparent from the following detailed description taken in connection with the accompanying drawings.

DESCRIPTION OF THE PREFERRED EMBODIMENTS OF THE INVENTION

Figure 1:
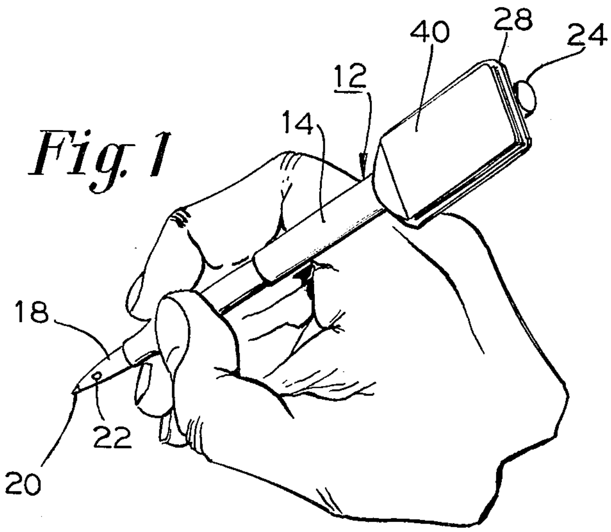
FIG. 1 is a perspective view illustrating the writing instrument of the invention in normal use.

In FIGS. 1 through 12 there is shown a fiber tipped pen 12 comprising a barrel 14 containing ink, closed at one end 16 and tapered at its other end 18 with an opening through which protrudes a tapered fiber or plastic tip 20. An aperture 22 is provided adjacent the tip for venting the ink barrel 14 to the atmosphere to permit a smooth flow of ink to the tip 20. Although a fiber or plastic tipped pen is shown and described for the purpose of illustration in FIGS. 1 through 12 it will of course be understood that in accordance with the broader aspects of the invention the pen may be of any suitable type which is provided with a removable cap 24 as for example ball point, felt tip or nib point type pen. Furthermore a pencil 12' incorporating a removable cap 24' as illustrated in FIG. 13 may serve as the writing instrument with any of the embodiments or modifications disclosed herein. The barrel 14 of pen 12 is shaped to accomodate the cap at either the end 16 or the end 18 in frictional engagement. When writing under normal conditions at a table or desk it is convenient to remove the cap 24 from its position covering the tip 20 to a position frictionally engaging the barrel 14 adjacent the other end 16. It should be understood that although the writing instrument illustrated is a pen in which the cap frictionally engages the barrel, any pen which has a removable cap which may engage the barrel 14 adjacent the writing tip end 18, as for example by threads or other suitable means and frictionally or otherwise engages the opposite end of the barrel would be equally suitable. Also suitable is a writing instrument in which the cap engages only the end remote from the writing tip, as for example cap 24' of pencil 12' and certain types of retractable tip pens.

Figure 3:
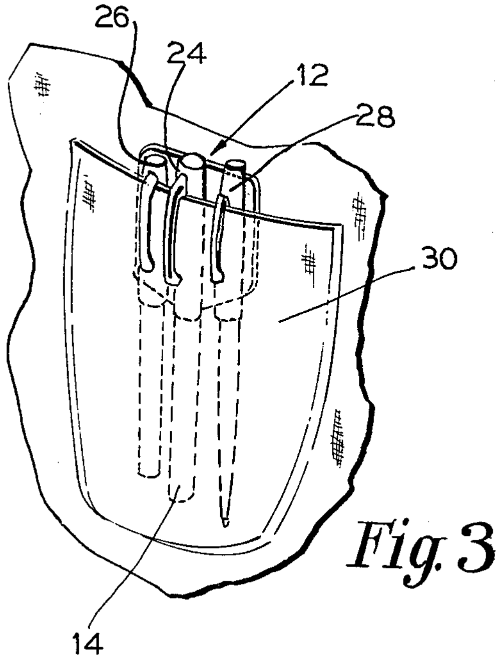
FIG. 3 is a partial perspective view illustrating the writing instrument of the invention disposed in a breast pocket.
Figure 4:
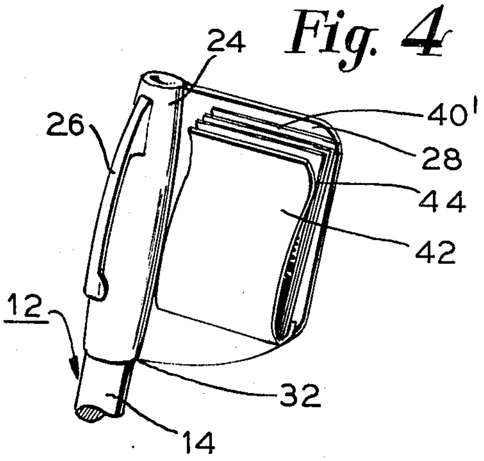
FIG. 4 is a partial perspective view of a modification of the invention.

The cap 24 or 24' may include a pocket engaging clip 26 mounted thereon at one end which extends axially toward the open end of the cap. A smooth, flat, relatively rigid plate 28 of thin, light weight sheet material which may be metal, plastic or other suitable material, is rigidly secured to the cap 24 or 24'. The plate 28 may be integrally formed with the cap 24 or 24', or it may be secured by a suitable adhesive or fastening device. The plate 28 intersects the cap tangentially, substantially centrally of the plate 28 on a line circumferentially spaced from the clip 26. Preferably, if the writing instrument includes a pocket clip the tangential intersection is diametrically opposite the clip 26 so that when the pen is clipped in position in the pocket 30 as shown in FIG. 3 the plate 28 engages the back portion of the pocket 30 and lies flat thereagainst. The plate 28 extends axially of the cap from a point adjacent the closed end of the cap 24; it may terminate at a position slightly beyond or at the circumferential edge 32 forming the open end of the cap 24. Although the preferred embodiments herein disclosed illustrate and describe the plate 28 with the above-described axial dimension it will of course be understood that in accordance with the broader aspects of the invention the axial extent of the plate 28 may be somewhat greater or less than that so long as it does not interfere with the comfortable grasping of the pen in the writing position when the cap 24 is positioned on the barrel 14 as shown in FIG. 1 and so long as the upper portion of the plate 28 remains unobtrusive when positioned in the pocket 30 as shown in FIG. 3. The plate 28 may extend laterally in both directions from the peripheral projection of the cap 24 thereon, as shown in FIG. 1 et al or only in one direction as shown in FIG. 4. It is preferred that one or both longitudinal edges 36 and 34 be straight edges to provide a guide for drawing straight lines with the writing instrument as in underlining or for other purposes. However, in accordance with the broader aspects of the invention the plate may take other suitable shapes as, for example, circular, if desired.

The plate 28 may be marked with indicia designating inches and increments of inches as at 38 along one or both edges. One edge may be marked with increments in eighths or quarter inches while the other edge may be marked in increments of tenths of inches. On the other hand one edge may be scaled in inches and fractions of inches while the other edge may be scaled in accordance with the metric system. These indicia provide along the straight edges a linear measuring guide. It should be understood also that the corners of the plate 28 may be marked to indicate angular measure in radians or degrees. The indicia preferably is disposed on the surface of the plate 28 adjacent the cap 24. A pad 40 of writing paper may be provided which is of such dimensions as to lie within the boundaries of the plate 28; this pad 40 may be secured to the plate 28 in any suitable manner as for example by a suitable adhesive as illustrated in FIG. 1 or by a clip or clasp as illustrated in FIGS. 5, 6 and 10.

Figure 5:
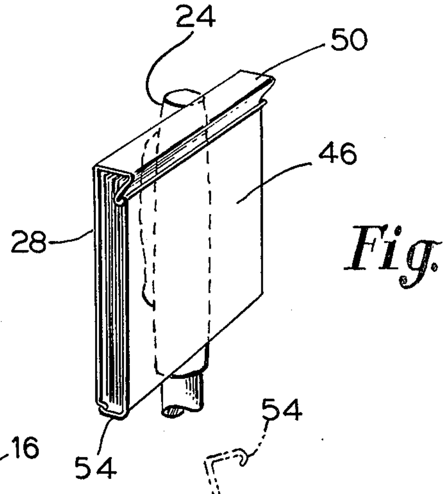
FIG. 5 is a partial perspective view of another embodiment of the invention.
Figure 6:
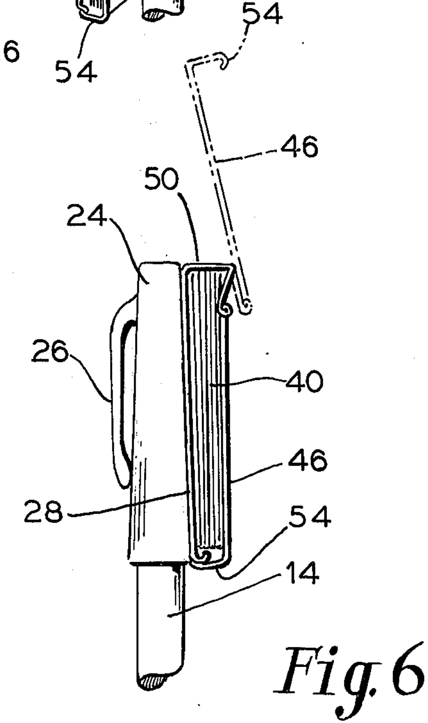
FIG. 6 is a side elevational view of the embodiment illustrated in FIG. 5.
Figure 10:
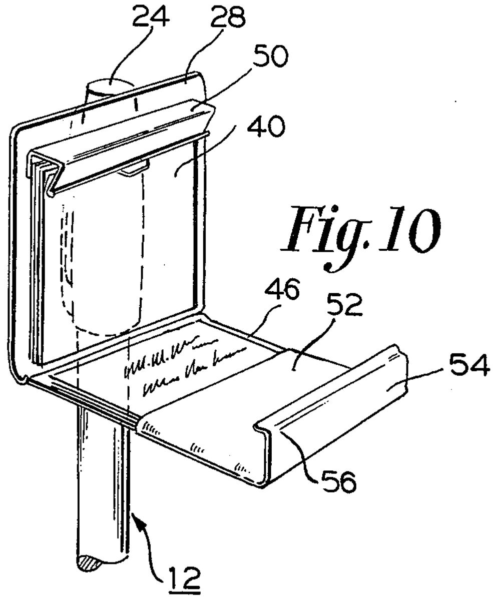
FIG. 10 is a partial perspective view of a modification of the embodiment shown in FIGS. 5 and 6.

As shown in FIGS. 5, 6 and 10 the writing paper may be held in position by clip or clasp of suitable design as for example the clasp 50. Thus the writing pad can be removed and replaced. In the example shown in FIGS. 5 and 6 the clasp 50 may serve as a hinge leaf to which the edge of a cover member 46 is pivotally secured. When additional force is applied to the cover member

Figure 9:
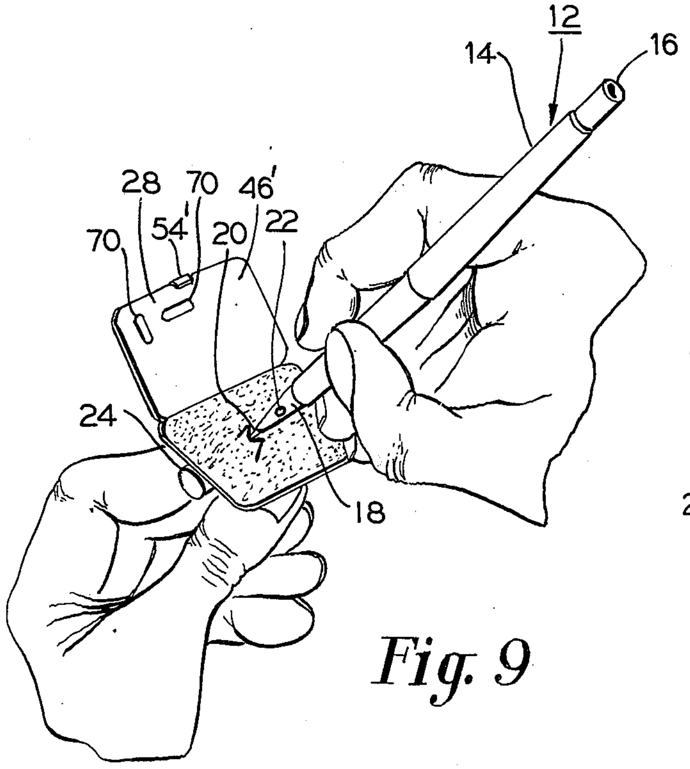
FIG. 9 is a perspective view of still another embodiment of the invention in use.

46 upon opening the cover it may serve as a lever to release the clasp 50 for removal and replacement of writing paper (see FIG. 6). A cover 46 may be hinged to the plate 28 at either a lateral top or bottom edge or at a longitudinal side edge as shown in FIG. 9. The cover may include a pocket such as at 52 (FIG. 10).

In FIG. 4 a modification is illustrated wherein the plate 28 extends laterally in only one direction from the tangential connection to the cap 24. In this modification a resilient paper holder 42 is secured to the surface of the plate 28 adjacent the cap and may include a concave curvature as at 44 to provide a holding surface which bears against the paper sheets at a line spaced from the upper end of the cap 24 as illustrated in FIG. 4 so that a stack 40' of individual sheets of paper can be inserted and so that individual sheets can be removed. The opposite side of the plate 28 remote from the cap 24 thus serves as a rigid backboard or writing surface.

A pocket 52 (FIG. 10) may be formed on the inner surface of the cover 46 to retain used sheets of paper from the pad 40. The pocket 52 extends from the free end of the cover 46 part way to the hinged end, thereby leaving a substantial portion of the paper exposed. The closure 46 may include at its free end a resilient inturned lip 54 (FIGS. 5, 6 and 10) or a catch 54' (FIG. 9) which engages the opposite edge of the plate 28 remote from the hinge to latch the cover member in closed position. In the modification shown in FIGS. 5, 6 and 10 the outer surface of the cover in the closed position may serve as a rigid writing board.

Figure 11:
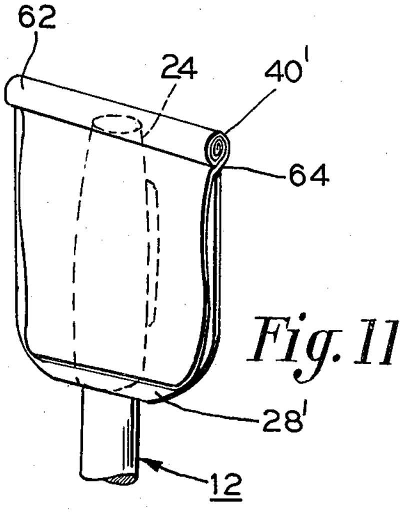
FIG. 11 is a partial perspective view of still another preferred embodiment of the invention.

Another preferred embodiment is illustrated in FIG. 11; this embodiment is substantially the same as the embodiment shown in FIG. 1 with a modified means for holding the writing paper. The upper edge of the plate 28' is formed into a tubular configuration 62 with an axially extending slot 64 in the tubular formation 62 adjacent the surface of the plate 28' which is on the side remote from the cap 24. The tubular formation 62 is open at its ends and receives a roll of note taking paper 40' which can be drawn through the slot 64 to lie against the adjacent surface of the plate 28'. The edge of the slot 64 may be formed as a cutter to permit removal of a used portion of the paper. The paper can also be rerolled through the slot back into the tube 62. It will be apparent that the tube 62 can be formed at the side or bottom edge the plate 28'.

Figure 2:
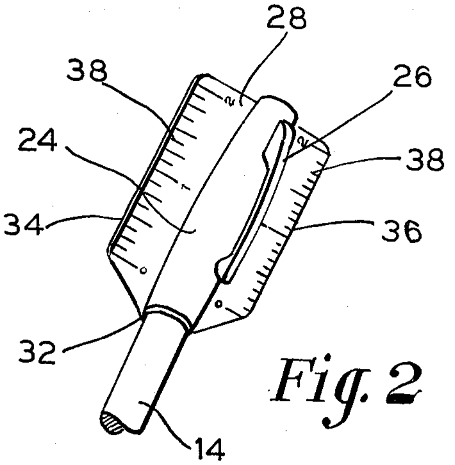
FIG. 2 is a partial perspective front view.
Figure 12:
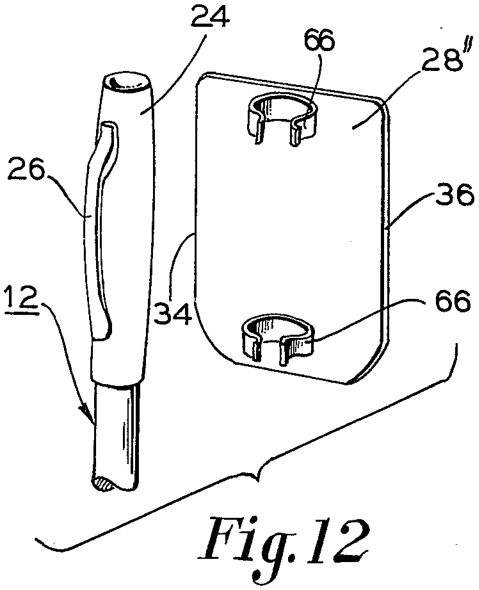
FIG. 12 is a partial perspective view of yet another embodiment.
Figure 13:
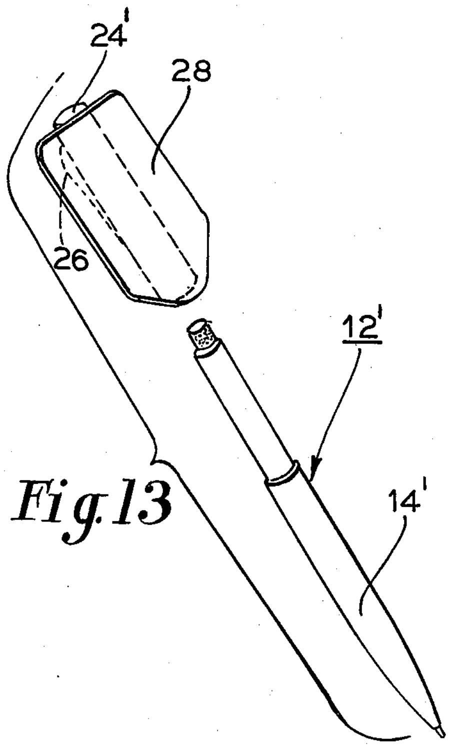
FIG. 13 is a modification of the embodiment illustrated in FIG. 1.

A removable plate 28'' is illustrated in the modified embodiment of FIG. 12. The plate 28'' may be substantially identical to the plate 28 shown in the FIG. 1 embodiment or may incorporate any of the features of all of the embodiments herein shown and described, such as a hinged cover or a tubular roll paper retainer; it may include the clip retainer 50 shown in FIG. 10 and may incorporate indicia as shown in FIG. 2. On the surface of the plate 28'' adjacent the cap in the example shown in FIG. 12 a pair of longitudinally spaced apart spring clips 66 are affixed to the surface of the body 28'' adjacent the cap for retaining the body 28'' on the cap. Although spring clips 66 are shown by way of example it will be understood that in accordance with the broader aspects of the invention other suitable types of clamping means may be provided for removably retaining the body 28'' on the cap 24.

Figure 7:
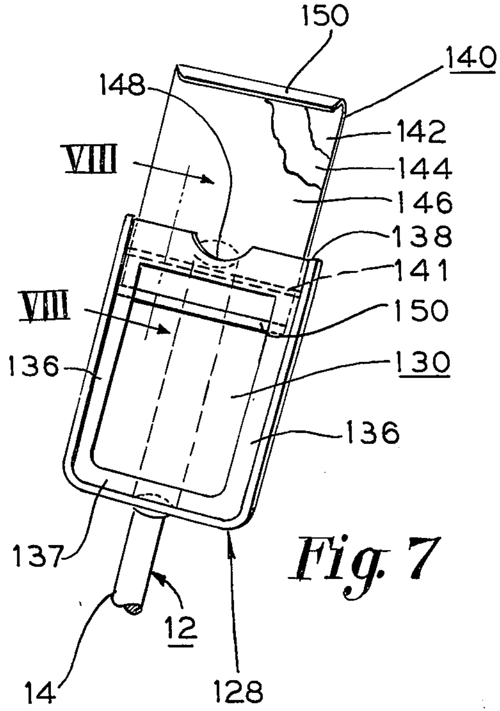
FIG. 7 is a partial perspective view of another embodiment of the invention.
Figure 8:
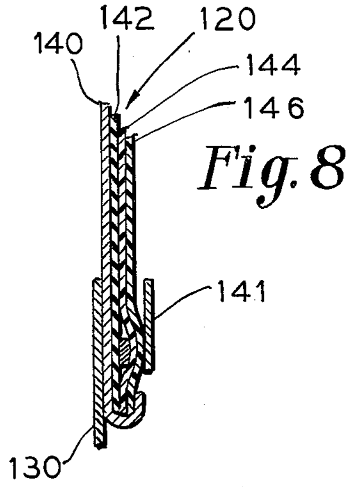
FIG. 8 is a longitudinal sectional view of the embodiment illustrated in FIG. 7 taken on line VII—VII looking in the direction of the arrows.

A modification of the backboard or plate is illustrated in FIGS. 7 and 8 wherein a mechanically erasable plate assembly 128 is secured to the cap 24 as in the previously described modifications. The plate 128 assembly is similar in construction to a conventional erasable plate now available, but is reduced in scale and weight and affixed to the cap 24. It typically comprises a relatively rigid rectangular body portion or frame 130 open on the side opposite the cap 24 of the writing instrument and closed on the other. The frame 130 includes a parallel axially extending channel 136 at each side, a channel 137 at one end, and an open slot 138 at the other end. A rigid writing plate 140 may be drawn through slot 138. The plate 140 has overlying its surface which faces the open side of the frame 130 three layers of material; nearest the plate a coating of dark colored adhesive material 142, next a semi-transparent sheet 144 overlying the dark colored adhesive layer 142, and on top a protective sheet of transparent material 146, such as for example celluloid. A separating bar 41 extends from one channel 137 to the other adjacent the slot 138. It is disposed intermediate the layer of adhesive material and the semi-transparent sheet 144. The longitudinal edges of plate 140 are slidably disposed in the two parallel channels 136 of the frame 130 such that it can be manually drawn in and out of the frame through slot 138. A semi-circular cutout 148 is provided to facilitate grasping of the plate 140. The plate 140 has two clamping flanges 150 provided along its top and bottom edges to retain the three layers of material. When the semi-transparent sheet is pressed onto the dark colored adhesive layer an image of the areas of the semi-transparent sheet which have been pressed onto the dark colored adhesive layer become visible. Notes may be written by means of any instrument having a blunt or rounded end which presses the semi-transparent sheet into contact with the adhesive layer. Obliteration of the written material may be effected by separating the semi-transparent sheet from the adhesive layer. This is accomplished by drawing the plate 140 through the slot 138 of the frame 130. The bar 141 causes the semi-transparent layer 144 to separate from the dark colored adhesive layer 142. The plate may then be slid back into the frame ready for reuse.

In lieu of the paper and other devices hereinabove described for note taking the writing surface of the body 28 or 28'' may be coated with a non-absorbent material which is slightly textured such as a plastic or enamel paint or other suitable or desirable materials. Marking can be made directly on the coated surface and readily rubbed off with a finger, a cloth such as a handkerchief or a paper tissue; the coated surface is then in condition for reuse. The surface of plate 28 in FIG. 9 illustrates such a coating. It is desirable to provide a cover 54' hinged at a longitudinal edge to protect the erasable surface and any notes thereon. An additional function can be incorporated wherein the cover 46' is apertured with various shaped openings as shown at 70 in FIG. 9 to serve as an eraser shield. It will be apparent that such apertures can be provided in the plates 28, 28', 28'' of any of the modifications herein described.

In FIG. 9 the invention is illustrated in use. The cap 24 with plate 28 mounted thereon is removed and held in one hand utilizing the cap as a handle to hold the writing surface in writing position. The writing instrument is held in the other hand in the writing position. Thus notes can be made in the absence of a table, available paper or other auxiliary writing equipment. Often a person finds oneself in a position where it is desired to jot down a note or information with only a pocket carried pen or a pencil available. With any of the embodiments hereinabove described one can carry self-contained writing equipment readily and unobtrusively in a shirt or coat breast pocket or in a handbag or other container. When positioned in the pocket as shown in FIG. 3 the body 28, 28', 28'' or 128 can accomodate additional writing instruments nestled in front of the plate in position next to the writing instruments of this invention. Thus the body 28, 28', 28'' or 128 also serves as a protective device to prevent inadvertent marking of the clothing if one of the additional writing instruments should be inserted in the pocket while the marking point is exposed.

It should now be apparent that a unique, self-contained multi-purpose writing instrument has been provided which is effective for making notations in the absence of auxiliary writing equipment, such as a table, a desk or other hard surface and can be of the usual size readily accomodated in the hand for normal writing; the instrument can be carried unobtrusively in an exposed pocket; it can serve as a pocket shield and can be useful as a linear or angular measuring device and as an underlining guide.

Certain specific embodiments of the invention have been described for the purposes of illustration, but it will be apparent that various modifications and other embodiments are possible within the scope of the invention. It is to be understood, therefore, that the invention is not limited to the specific arrangements shown but in its broadest aspects it includes all equivalent embodiments and modifications which can come within the scope of the invention.

What is claimed is:

1. An elongated writing instrument comprising a first section having a marking means at an end thereof and a separable second section telescopically and removably engaging said first section, a relatively rigid, relatively thin, flat plate having one side thereof joined to said second section, a portion thereof protruding laterally from said second section and extending longitudinally from adjacent one end of said second section toward the other end thereof, a pocket clip mounted on said writing instrument diametrically opposite to an area of contact between said plate and said second section, said plate having a substantially uninterrupted planar surface on the side opposite said one side and means for removably mounting a supply of writing paper upon said planar surface for writing upon by said marking means whereby said instrument serves as a writing instrument, a writing base, a marking surface and a pocket shield.

2. A writing instrument according to claim 1 wherein a cylindrical container for receiving a roll of writing paper is disposed at an edge of said plate, said container having a longitudinal slot for dispensing a portion of said paper to a position overlying said planar surface.

3. A writing instrument according to claim 1 wherein an edge of said plate is linear and includes indicia inscribed adjacent said edge for indicating measurements of length whereby said edge can serve as a measuring and line ruling device.

4. A writing instrument according to claim 1 including a cover member hingedly attached to an edge of said planar surface for movement from a position overlying said pad of writing paper to a position exposing said pad of writing paper.

5. A writing instrument according to claim 1 wherein said plate includes a fastening device for removably securing it to said second section only on an area diametrically opposite to the longitudinal centerline of said pocket clip.

6. A writing instrument according to claim 1 wherein said supply is replacably retained on said planar surface.

* * * * *